United States Patent [19]
Ewald

[11] Patent Number: 4,491,446
[45] Date of Patent: Jan. 1, 1985

[54] HOLD-DOWN APPARATUS FOR UNFOLDABLE FUNCTIONAL ELEMENTS

[75] Inventor: Ruediger Ewald, Munich, Fed. Rep. of Germany

[73] Assignee: Messerschmitt-Boelkow-Blohm Gesellschaft mit beschraenkter Haftung, Munich, Fed. Rep. of Germany

[21] Appl. No.: 514,931

[22] Filed: Jul. 18, 1983

[30] Foreign Application Priority Data

Jul. 29, 1982 [DE] Fed. Rep. of Germany ....... 3228284

[51] Int. Cl.³ .......................... B60P 1/64; B64G 1/22
[52] U.S. Cl. .................................. 410/32; 244/173; 410/79; 410/103
[58] Field of Search ................... 244/158 R, 173, 161; 410/32, 38, 34, 96, 103, 111, 156; 292/256.5; 269/228, 24, 134, 157, 160

[56] References Cited

U.S. PATENT DOCUMENTS

| 2,583,053 | 1/1952 | Kestner et al. | 269/228 |
| 3,270,801 | 9/1966 | Richter et al. | 292/256.5 |
| 4,419,033 | 12/1983 | Roth et al. | 244/173 |

FOREIGN PATENT DOCUMENTS

| 34193 | 8/1981 | European Pat. Off. | 244/173 |
| 81401 | 9/1983 | European Pat. Off. | 244/173 |
| 1014408 | 6/1965 | United Kingdom | 292/256.5 |

Primary Examiner—Galen L. Barefoot
Attorney, Agent, or Firm—W. G. Fasse; D. H. Kane, Jr.

[57] ABSTRACT

A hold-down apparatus clamps functional elements, for instance solar cell panels which are unfoldable from a carrying body, possibly a spacecraft, in their folded condition. The folded functional elements (15) rest on a counter support (3) provided on the carrying body. A pressure piece (4) is mounted on the outermost functional element (15a). A swingable retaining arm or bail (5) rests with its one end on the pressure piece (4). In order to produce a high biasing force in the locked position, and in order to be able in an easy and reliable manner to reverse at any time from the unlocked to the locked position, the hold-down apparatus has the following features. A lever arm (7) is articulated or journalled to the counter support (3) and may be rotated by means of a drive element (10). The lever (7) is rotatably connected at one of its ends to the retaining arm or bail (5) which is biased by a spring (9) pressing in the direction toward the pressure piece (4). Through pulling the lever arm (7) the retaining arm or bail (5) comes into the locked position, in which it rests on the pressure piece (4), and in which it comes under tensile stress due to its purposely chosen short length for clamping the functional elements in their folded condition.

5 Claims, 1 Drawing Figure

U.S. Patent       Jan. 1, 1985       4,491,446
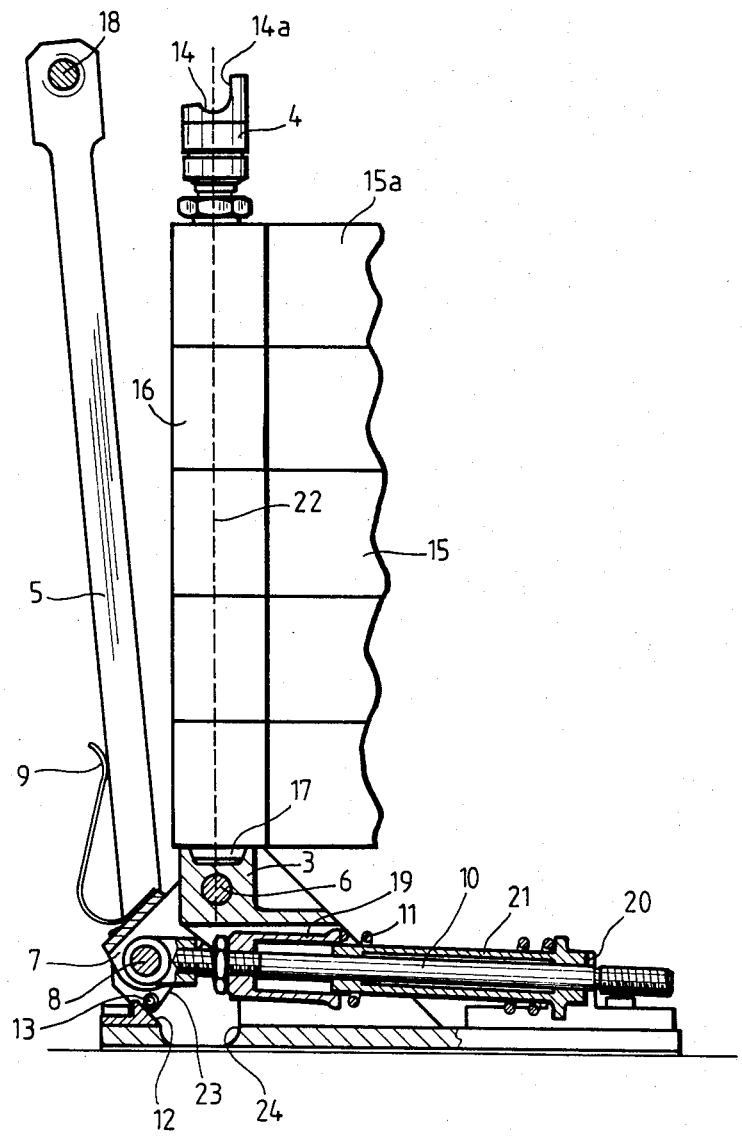

HOLD-DOWN APPARATUS FOR UNFOLDABLE FUNCTIONAL ELEMENTS

BACKGROUND OF THE INVENTION

The invention relates to a hold-down apparatus for functional elements which are unfoldable from a carrying body such as a satellite carrying solar panels formed by such functional elements. A counter support on the carrying body supports the folded functional elements. A pressure piece is mounted on the functional element furthest away from the counter support. A pivotable retaining arm or bail is provided, one end of which may be set on the pressure piece for applying a downwardly directed force on the counter support.

Such an apparatus is known from European patent publication (EP-OS) 34,193 which discloses a hold-down apparatus for unfoldable panels carrying solar cells for spacecraft or satellites. During transportation into space the panels are folded-up and are braced or supported by a counter support attached to the spacecraft functioning as a carrying body. In order to be able to maintain this folded-up condition with certainty during flight, structural features are provided for the purpose of pressing the panels against the counter support with a high biasing force. For this purpose, the panel farthest away from the counter support carries a pressure piece onto which may be set a pivotable retaining arm or bail. The biasing force is then applied through tightening a clamp bolt which is connected to the retaining arm or bail and which is effective on the pressure piece. Further structural elements are provided in the known apparatus, for locking the retaining arm in this position, on the one hand, and for removing the locking at the desired moment, on the other hand. After a single unlocking, however, a new relocking is not possible. Rather, it is assumed that the panels, once unfolded, remain in this unfolded position.

Meanwhile, however, a stage has been reached in space technology in which repeatedly reusable components are used. Therefore, it may be rather desirable after a certain time to again fold-up and relock in this folded position functional elements which were once unfolded, such as panels carrying solar cells or even unfoldable antenna elements or the like.

OBJECTS OF THE INVENTION

In view of the above it is the aim of the invention to achieve the following objects singly or in combination:

to make available a hold-down apparatus of the initially mentioned type, which is able to produce a high biasing force in the locked state and which may be reversed reliably from the unlocked to the locked state and vice versa at any time by simple structural means;

to securely mount the repeatedly foldable and unfoldable elements of the hold-down mechanism so that these elements are capable of withstanding the stresses encountered during launching and landing of a spacecraft or under any other operating conditions;

to provide a hold-down device for a folding and unfolding mechanism, which device is universally applicable for its purpose, not only in a spacecraft; and to reduce the number of structural elements of the hold-down device so that its ability to withstand wear and tear is increased.

SUMMARY OF THE INVENTION

These objects are achieved according to the invention by means of the following construction features. A lever arm which is journalled or pivoted to a journal axis mounted in a counter support is tiltable by means of a push- or pull-drive element. The lever arm is rotatably connected by a hinge or pivot joint at the end opposite to or remote from the journal axis, with an end of a retaining arm or bail. A spring swings the retaining arm or bail about the hinge or pivot joint in the direction toward a pressure piece, whereby the lever arm, during simultaneous tilting of the retaining arm or bail and setting of the retaining arm or bail onto the pressure piece, is tiltable by a pulling force into a locked position corresponding to its dead point position relative to the journal axis. Before reaching this position, the retaining arm or bail comes under tensile stress due to its purposely chosen, relatively short length.

Before the structural elements according to the invention can become effective it is assumed that the functional elements, particularly solar cell panels or antenna elements, have already been folded up by another mechanism, not part of the invention, and are resting as a pile or stack on the counter support of the carrying body, such as a satellite capsule. The present hold-down mechanism then makes it possible to produce a high biasing force directed from the pressure piece toward the counter support, particularly toward the journal axis. The pressure piece is mounted on the outer functional element relative to the counter support. This initial biasing force is sufficient to securely hold the functional elements even during extremely high mechanical loads or stresses, such as those existing during the start and landing phases of a spacecraft. Such biasing is achieved in that the drive means exerts a tension on the lever arm which then pivots into the line of force defined by the pressure piece and the journal axis. Simultaneously, the retaining arm or bail is tilted over in the direction of the pressure piece by the spring pressing in on it, and then the retaining arm or bail is set onto or comes to rest on said pressure piece. This operation occurs before the lever arm swings into its dead position, in which it is oriented in the direction of the above-mentioned line of force. In the relatively small angle range from setting the lever arm on the pressure piece to the dead position, a slight elongation of the retaining arm or bail in its longitudinal direction occurs combined with a correspondingly high biasing force which increases until the dead position is reached. In this locked position the lever arm as well as the retaining arm or bail, which embraces, for instance in a U-shape, the pressure piece, the ends of the functional elements, the part of the counter support which carries the hinge joint, and the lever arm, lie in the same plane which is defined by the pressure piece, the journal axis, and the hinge joint.

The hold-down apparatus is unlocked by applying a pressure force to the lever arm through the drive means, so that said lever arm may again swing out of its dead position. This operation reduces the biasing force, whereupon the retaining arm or bail is lifted off the pressure piece, so that an unfolding mechanism for the functional elements may become active.

BRIEF FIGURE DESCRIPTION

In order that the invention may be clearly understood, it will now be described by way of example, with reference to the single figure showing in a schematic manner a hold-down apparatus according to the invention for unfoldable solar cell panels of a satellite, partially in section.

DETAILED DESCRIPTION OF A PREFERRED EXAMPLE EMBODIMENT AND OF THE BEST MODE OF THE INVENTION

The FIGURE shows a hold-down mechanism for unfoldable solar cell panels 15 of a satellite. The panels 15 are shown in the folded condition. The uppermost panel 15a carries a pressure piece 4. In the depicted state, the pile already rests on a counter support 3, which is part of the satellite functioning as a carrying body (not shown). The individual solar cell panels 15 end on the left in projections 16 which posess a relatively slight size perpendicularly to the drawing plane in relation to the rest of the area of the panels. The panels may engage one over another and in the counter support 3 by means of suitably shaped cams 17 and corresponding depressions. A journal axis 6 is supported in the counter support 3 and a lever arm 7 is swiveling or journaling around it. The lever arm is rotatably connected to an approximately U-shaped retaining arm or bail 5 by a hinge or pivot joint 8. The bail 5 has a crosspiece 18, which is oriented perpendicular to the drawing plane. The crosspiece 18 is constructed and arranged to engage a trough 14 of the pressure piece 4 and to exert a downward force on the latter, namely a force toward the pressure support 3 or rather toward the swivel joint 6. A stop flange 14a provided on the pressure piece 4 ensures that the crosspiece 18 does not swing out past the trough 14. A spring 9 attached to the lever arm 7 produces a torque moment on the retaining arm or bail 5 in a direction toward the pressure piece 4.

A pull rod 10 cooperating with a longitudinally acting spiral spring 11, engages the hinge or pivot joint 8. A collar 19 which supports the spiral spring 11 is attached to the pull rod 10. The pull rod 10 is furthermore guided inside a guiding piston 21 which is rotatably mounted to a bearing bracket 20. The bearing bracket 20 forms a part of the counter support 3.

Furthermore a slanted strike face 12 is provided as a part of the counter support 3. A roller 13 attached to the lower end 23 of the retaining arm or bail 5 rests against the slanted strike face 12 in the shown position of the arm or bail 5. The depicted position corresponds to the unlocked position of the hold-down apparatus. The unfolding mechanism (not shown but conventionally provided for the solar cell panels) can become active in this position of the bail 5.

If the hold-down apparatus, with an already folded panel stack or pile as shown, is to be put into the locked position, then the pull rod 10 must be pulled to the right. This may be achieved by means of a motor driven block and tackle arrangement, wherein the cable may be arrested after the locked position has been reached. As a result of the motion, the pull rod 10 subjects the spiral spring 11 to compression, thereby biasing the spring 11. Furthermore, a torque moment is exerted on the lever arm 7 relative to the journal axis 6, whereby the lever arm 7 is rotated counterclockwise. Due to this rotation the roller 13 loses contact with the strike face 12, whereupon the retaining arm or bail 5, now under the influence of the spring 9, swings clockwise. Such clockwise tilting of the bail 5 is hindered as long as the roller 13 contacts the strike face 12. Thereafter, the retaining arm or bail 5 swings over, until its crosspiece 18 engages or rests in the trough 14 of the pressure piece 4. At this point in time, the rotation of the lever arm 7 is not yet completed, rather, there is still a certain angular range to be passed through before the position in which the hinge or pivot joint 8 swings directly into the line of force defined by the pressure piece 4 and the journal axis 6.

Throughout this last angular range the crosspiece 18 of the retaining arm or bail 5 can no longer give way downwardly, so that the latter undergoes a certain elongation, or rather elongation under stress, the magnitude of which is determined by the length of the retaining arm or bail 5. This feature produces a biasing force which presses the panel stack 15 onto the counter support 3. Materials suitable for making the retaining arm or bail 5 include metals having a certain elasticity relative to elongation. The arm or bail is dimensioned so that the resulting maximum elongation does not exceed its elasticity range.

In the locked position now achieved, the axes of symmetry of the retaining arm or bail 5, of the pressure piece 4, of the journal axis 6, and of the hinge or pivot joint 8 lie in one plane, which is shown in the FIGURE by a dashed line 22. The retaining arm or bail 5, which is under tension, is engaged by its crosspiece 18 in the trough 14 of the pressure piece 4, and rests with its lower end or flank 23 against an edge 24 of the counter support 3. The U-shaped retaining arm or bail 5 then embraces or reaches around both ends of the hinge or pivot joint 8, the lever arm 7, the part of the counter support 3 which supports the journal axis 6, the projections 16 of the solar cell panels 15, as well as the pressure piece 4.

In order to unlock the thus locked hold-down apparatus, the pull rod 10 is released and moves to the left due to the pressure or energy stored in the compressed spiral spring 11 on the collar 19, whereby the lever arm 7 is rotated clockwise out of the locked position, and the tension elongating the retaining arm or bail 5 decreases. Through further rotation, the roller 13 comes into contact with the strike face 12, so that now in further sequence a counterclockwise directed torsional moment is exerted on the retaining arm, or bail 5, whereby the latter is lifted out of the trough 14 of the pressure piece 4 and swings away from said pressure piece, that is to the left in the FIGURE, against the force exerted by the spring 9. Now the unfolding mechanism of the solar cell panels may become active.

In view of the foregoing it will be appreciated that the pressure piece 4 with its depression or trough 14 acts as a catch for the retaining arm or bail 5 when the bail 5 is set onto the pressing piece 4 to hold down the folded panels 15. Furthermore, the counter support 3 with its sloped strike face 12 enforces a swinging motion of the retaining arm or bail 5 away from the pressure piece 4 for moving the bail 5 into the shown release position, due to the contact of the lower end 23 of the retaining arm or bail 5 with the strike face 12, after the pressure induced swinging of the lever arm 7 away from the locked position. Since the retaining arm or bail 5, after being lifted off the pressure piece 4, is still held in the area of the pressure piece 4 by the spring 9 pressing in on it, the bail 5 might possibly be in the way of the unfolding of the functional elements 15, depending on the actual construction of a satellite. Therefore, it is advisable to make certain that the retaining arm or bail 5 can swing away from the area of the pressure piece 4 against the force of the spring 9. This is accomplished by the strike face 12 which comes into contact with the end 23 of the retaining arm or bail 5 after the lever arm 7 swings out of its dead position into a certain angular position relative to the end 23. The end 23 of the retaining arm or bail 5, advantageously with the aid of the roller 13 attached thereto, may now glide along the sloped strike face 12. The slope should preferably be chosen so that simultaneously a torsional moment opposed to the force of the spring 9 is exerted on the retaining arm or bail 5 so that it swings away from the pressure piece 4 and thereby permits the unfolding motions under any circumstances.

The pull rod 10 engaging the hinge or pivot joint 8 may suitably be used as the drive element. The rod 10 extends through an opening in the counter support member 3 with sufficient play to allow for the necessary movement of the sleeve 19 with the rod 10 extending through the sleeve 19. The pull rod 10 is loaded or biased longitudinally by the spiral compression spring 11 which is stressed in the locked position. The pull rod 10 must then be anchorable or fixable in this spring-loaded locked position. After this anchoring is released, the spiral spring immediately takes effect and exerts on the lever arm 7 a pressure and a torsional moment which tends to swing the lever arm 7 out of the locked position. An advantageous method for activating the pull rod 10 is the use of a motor driven block and tackle device. The motor must be able to pull in as well as let out the cable of the block and tackle device, whereby the motion of the lever arm 7 is caused respectively for locking or unlocking.

The hold-down apparatus according to the invention may be especially advantageously installed on spaceships for unfoldable functional elements such as solar cell panels, antenna elements and the like, but it is by no means limited thereto. Other applications may be easily found in other fields of technology, which require that unfoldable functional elements may be securely mechanically locked in a folded condition or released for unfolding.

Although the invention has been described with reference to specific example embodiments, it will be appreciated, that it is intended to cover all modifications and equivalents within the scope of the appended claims.

What is claimed is:

1. A hold-down apparatus for functional elements which are unfoldable from a carrying body, comprising counter support means (3) on the carrying body for supporting folded functional elements, a pressure piece (4) mounted on the functional element (15a) furthest away from said counter support means, a swingable retaining bail (5) operatively arranged for cooperation with said pressure piece (4) for clamping a stack of functional elements in their folded condition, journal means (6) supported in said counter support means (3), a lever arm (7) operatively secured to said journal means (6), drive means (10, 11) operatively mounted on said carrying body, pivot means (8) operatively connecting one end of said lever arm (7) to said drive means (10) and to said retaining bail (5), spring means (9) carried by said lever arm (7) and bearing against said retaining bail (5) for urging said retaining bail around the pivot means (8) toward said pressure piece (4), whereby the lever arm (7), during simultaneous swinging of the retaining bail (5) and setting thereof onto the pressure piece (4), is tiltable by said drive means (10) into a locked position corresponding to its dead point relative to said journal means (6), and whereby the retaining bail (5) engaging said pressure piece (4) is subjected to tensile stress due to its purposely chosen, relatively short length, prior to said lever arm (7) reaching its locked position, and wherein said counter support means (3) comprise a sloped strike face (12) which causes a tilting motion of said retaining bail (5) directed away from the pressure piece (4) through contact with an end (23) of said retaining bail (5) after said lever arm (7) swings out of the locked position under the operation of said drive means (11).

2. The hold-down apparatus of claim 1, wherein said pressure piece (4) comprises a trough (14) for catching said retaining bail (5) sitting on said pressure piece (4).

3. The hold-down apparatus of claim 1, further comprising roller means (13) attached to said end (23) of said retaining bail (5) for initiating contact between said sloped strike face (12) and said retaining bail (5).

4. The hold-down apparatus of claim 1, wherein said drive means comprise a pull-rod (10) operatively connected to said pivot means, and a spiral compression spring (11) for biasing said pull-rod (10), said compression spring being cocked in the locked position for applying pressure for releasing said bail (5).

5. The hold-down apparatus of claim 4, wherein said pull rod (10) is activatable by means of a motor driven tackle means, such as a cable pull.

* * * * *